Figure 1:
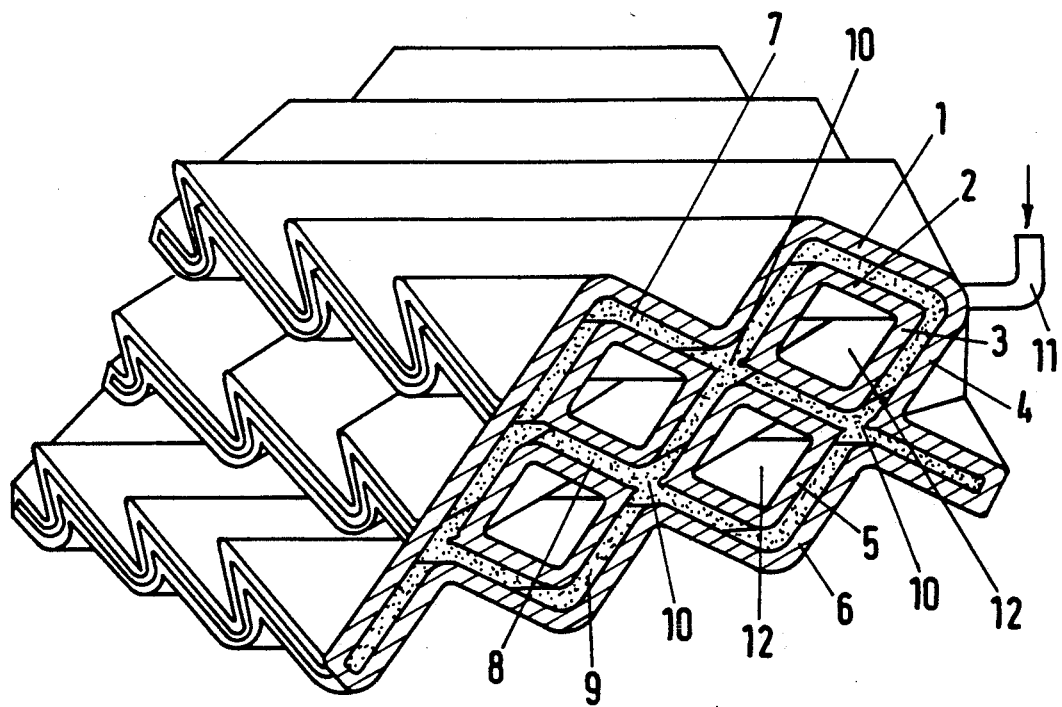

United States Patent [19]

Kubicek

[11] Patent Number: 5,174,935
[45] Date of Patent: Dec. 29, 1992

[54] METHOD OF FORMING A CERAMIC BODY

[75] Inventor: Vladimir Kubicek, Seuzach, Switzerland

[73] Assignee: Sulzer Brothers Limited, Winterthur, Switzerland

[21] Appl. No.: 130,100

[22] Filed: Dec. 7, 1987

[30] Foreign Application Priority Data

Dec. 15, 1986 [CH] Switzerland ................ 4980/86

[51] Int. Cl.$^5$ ........................................... C04B 38/06
[52] U.S. Cl. ............................. 264/59; 264/44; 264/60; 264/62; 264/67
[58] Field of Search ............... 264/44, 59, 60, 62, 264/67

[56] References Cited

U.S. PATENT DOCUMENTS

| | | | |
|---|---|---|---|
| 3,940,301 | 2/1976 | Straw | 264/44 |
| 4,017,347 | 4/1977 | Cleveland | 264/59 |
| 4,157,929 | 6/1979 | Kubicek | 156/89 |

FOREIGN PATENT DOCUMENTS 2807755 3/1979 Fed. Rep. of Germany .
3128603 6/1987 Fed. Rep. of Germany .

Primary Examiner—James Derrington
Attorney, Agent, or Firm—Kenyon & Kenyon

[57] ABSTRACT

In the method of forming a ceramic body, such as for use as a packing body, a dried array of corrugated layers containing ceramic material is first obtained in a green state. Thereafter, the array is cut, for example using a saw, into a desired shape and, thereafter, fired at a firing temperature sufficient to form the array into a one piece ceramic body. The body may initially be cast in a mold which can be cut to shape prior to the final firing step. Alternatively, individual layers of glass fiber material may be coated with ceramic material and dried into the green state prior to cutting and firing.

5 Claims, 2 Drawing Sheets

METHOD OF FORMING A CERAMIC BODY

This invention relates to a method of forming a ceramic body. More particularly, this invention relates to a method of forming a ceramic packing. Still more particularly, this invention relates to a ceramic packing of interconnected corrugated layers.

Heretofore, various types of ceramic bodies have been known for use in various manners. For example, ceramic bodies have been used as packings for mass exchange and heat exchange processes. In addition, ceramic bodies have been provided as catalyst carriers in industrial plants such as in exhaust stacks for hot corrosive gases or vapors.

In order to manufacture such ceramic bodies, it has been known to prepare discrete layers of ceramic material and to then cut the layers to final form, for example, using a saw. After cutting, the individual layers have been connected together, for example, by using ceramic or a foreign binding material stacked and fired as a whole. However, cutting the individual layers to final form is a time-consuming process. Further, if the ceramic body were to be used as a packing body in a cylindrical column, a problem arises in that the brittle nature of the layers causes the brittle material to break off at least at the boundary faces during cutting.

It has also been known, for example, from U.S. patent application Ser. No. 883,061, filed Jul. 8, 1986, to cast a ceramic body as a whole with connection sites integrally connecting the individual layers of the body so as to form a one-piece body. In such a method, after filling a mold with ceramic material to define individual corrugated layers which are interconnected, a firing process is carried out in an essentially residue-free combustion and/or gasification of the mold. However, while this method provides various advantages, there is a disadvantage in that a difficult and elaborate processing of the fired packing bodies into an orderly array, especially for columns, is required.

It has also been known from Swiss Patent 619,202 and U.S. Pat. No. 4,157,929 to manufacture porous, dimensionally stable, heat-resistant and corrosion-resistant plate-like structures of fiber glass or glass fiber bundles. In this case, a coating of combustable ceramic material is applied to the surface of a glass fiber structure so that during firing, the intersections of the glass fibers fuse together while, during the firing process, a ceramic shell forms to provide a supporting skeletal structure. Individual layers may be separately fired and thereafter placed in stacked array on each other to form a packing body or several layers may be stacked prior to firing so that the individual layers fuse together during firing. However, such techniques require time-consuming procedures and may also be subjected to breaking off at the boundaries if cutting is required.

Accordingly, it is an object of the invention to provide a cost-efficient method for making ceramic bodies.

It is another object of the invention to reduce the cost of manufacture of ceramic bodies.

It is another object of the invention to simplify the method of making ceramic packings.

Briefly, the invention provides a method of forming a ceramic body wherein a dried array of corrugated layers containing ceramic material is first obtained in a green state. Thereafter, the array is cut into a predetermined shape and thereafter fired at a temperature sufficient to form the layers into a one-piece ceramic body.

By cutting the body to a final shape while in the green state, problems are avoided in breaking off the material at the boundaries since the body has not yet become brittle. Further, the body can be readily handled in the green state for shaping by any suitable means into the desired final shape.

In one embodiment, in order to obtain the green state body, a mold of a plurality of layers of material are formed to define a plurality of cavities with passages connecting the adjacent cavities. Thereafter, a suspension containing ceramic material is introduced into the mold cavities and the mold is heated to a temperature sufficient to dry the ceramic material into the green state.

In another embodiment, individual corrugated layers of glass fiber material impregnated with a binding substance are stacked together. The stacked layers are then immersed in a ceramic solution to form a coating capable of being fired thereon. The stacked layers are then dried into a green state.

Figure 2:
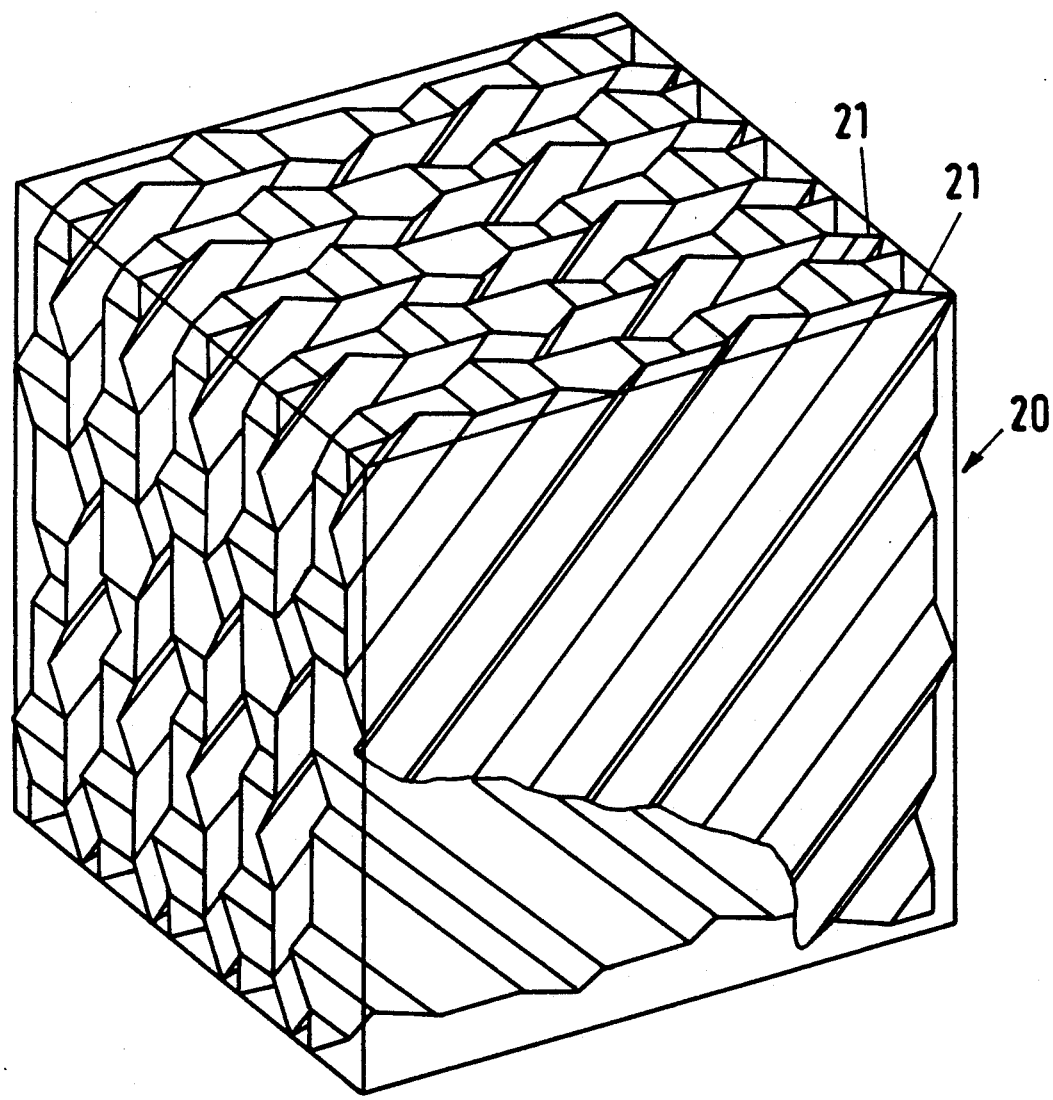

These and other objects and advantages of the invention will become more apparent from the following detailed description taken in conjunction with the accompanying drawings wherein:

FIG. 1 illustrates a perspective view of a mold filled with a ceramic suspension for forming a dried array of corrugated layers in accordance with the invention; and FIG. 2 illustrates a packing body constructed of glass fiber layers in accordance with the invention.

Referring to FIG. 1, in order to perform the method, a mold is formed of pairs of layers 1, 2; 3, 4; 5, 6 to define a plurality of cavities 7, 8, 9 disposed in parallel relation to each other with transverse passages 10 connecting adjacent cavities. The layers 1–6 may be made of a felting screen-shaped (absorbent) cellulose substance, for example cardboard. In this respect, the mold may be constructed as described in pending U.S. patent application Ser. No. 883,061, filed Jul. 8, 1986.

The mold is also provided with a filling aperture 11 which communicates with at least one of the cavities 7, 8, 9.

In order to form a ceramic body, the mold is provided with side supporting walls (not shown) and a viscous suspension containing a ceramic component consisting of kaolin, feltspar, quartz and water, as well as soda is poured into the filling aperture 11. During this time, the suspension flows through the passages 10 from one layer to another and fills the cavities 7, 8, 9 between the layers 1–6. A draining process also takes place in which the liquid is withdrawn from the suspension and absorbed by the cardboard.

Thereafter, the mold is placed in a drying oven and dried for approximately six hours at approximately 70° C. During this time, the moist air is drawn off with the hollow spaces 12 between the pairs of layers facilitating removal of the moist air.

After drying, the dried array of corrugated layers is still supported by the layers 1–6 and is in a green state, that is an unfired state. At this time, the dried array is cut to final shape, for example, with a belt saw. During this time, the layers 1–6 provide sufficient support and necessary strength for the filling body to permit the cutting process to be performed. The filling body is still in a soft (plastic) state and can, therefore, be simply cut to any shape.

After cutting is completed, the mold layers 1–6 with the filling body is placed in an oven and heated to a firing temperature of approximately 1400° C. and is maintained at this temperature for approximately three hours while the combustion gases from the layers 1-6 are drawn off and only the finished ceramic body remains.

Referring to FIG. 2, a ceramic body 20 may be formed of discrete corrugated layers 21. In this case, the layers 21 consist of glass fibers, for example in the form of glass fiber bundles which have been impregnated with a binding substance, for example colloidal silica. In this case, the individual layers are dried and given a corrugated shape. Thereafter, the corrugated layers are stacked on each other and the so generated filling body of stacked layers is immersed in a ceramic solution to form a coating capable of being fired. In this respect, the solution may be in the form of a sludge with ceramic powder.

The stacked layers are then dried into a green state and the stacked array is then cut to a final shape in an analogous manner to the structure described with respect to FIG. 1.

Thereafter, the shaped layers are fired in a firing oven at a temperature sufficient to melt and fuse the glass fiber material in adjacent layers together at intersecting points of contact. At the same time, the ceramic material forms a skeletal structure over the glass fiber material, for example as described in U.S. Pat. No. 4,157,929.

After the firing process, a porous, dimensional stable, heat and corrosion resistant structure is obtained.

The invention thus provides a method of manufacturing a ceramic body in a relatively simple cost-efficient manner.

Further, the invention permits ceramic bodies to be produced with a desired shape, for example for use in packing bodies in material and heat exchange columns without great effort.

What is claimed is:

1. A method of forming a ceramic body comprising the steps of
    forming a mold comprising a plurality of layers of material to define a plurality of cavities disposed in parallel relation to each other with transverse passages connecting adjacent cavities;
    introducing a suspension containing a ceramic component into said cavities;
    uniformly distributing the suspension through said cavities;
    withdrawing fluid from said suspension into the mold layers until the ceramic material remains in said cavities;
    thereafter heating the mold to a temperature sufficient to dry the ceramic material into a green state;
    cutting the dried mold and ceramic material into a predetermined shape; and
    thereafter firing the shaped mold at a temperature sufficient to remove the layers of mold material and form a one-piece ceramic body.

2. A method as set forth in claim 1 wherein the mold is heated to a temperature sufficient to burn the layers of mold material.

3. A method as set forth in claim 1 wherein the mold is heated to a temperature sufficient to vaporize the layers of mold material.

4. In a method of forming a ceramic body, the steps of
    obtaining a dried array or corrugated layers containing ceramic material in a green state by forming a mold comprising a plurality of layers of material to define cavities with passages connecting adjacent cavities, introducing a suspension containing ceramic material into the mold cavities, and heating the mold to a temperature sufficient to dry the ceramic material into the green state;
    cutting the array into a predetermined shape while in said green state; and
    thereafter firing the shaped array of layers at a temperature sufficient to form the layers into a one piece ceramic body.

5. In a method of forming a ceramic body, the steps of
    obtaining a dried array of corrugated layers containing ceramic material in a green state by stacking individual corrugated layers of glass fiber material impregnated with a binding substance, immersing the stacked layers in a ceramic solution to form a coating capable of being fired thereon, and drying the stacked layers into the green state;
    cutting the array into a predetermined shape while in said green state; and
    thereafter firing the shaped array of layers at a temperature sufficient to form the layers into a one piece ceramic body.

* * * * *

UNITED STATES PATENT AND TRADEMARK OFFICE
CERTIFICATE OF CORRECTION

PATENT NO. : 5,174,935
DATED : December 29, 1992
INVENTOR(S) : Kubicek It is certified that error appears in the above-identified patent and that said Letters Patent is hereby corrected as shown below:

Column 4, line 20, change "or" to --of--.

Signed and Sealed this

Fifth Day of July, 1994

Attest:

BRUCE LEHMAN

*Attesting Officer*     *Commissioner of Patents and Trademarks*